United States Patent
Anupam et al.

(10) Patent No.: US 6,535,912 B1
(45) Date of Patent: Mar. 18, 2003

(54) METHOD FOR CREATING AND PLAYING BACK A SMART BOOKMARK THAT AUTOMATICALLY RETRIEVES A REQUESTED WEB PAGE THROUGH A PLURALITY OF INTERMEDIATE WEB PAGES

(75) Inventors: Vinod Anupam, Scotch Plains, NJ (US); Juliana Freire Silva, Mahwah, NJ (US); Bharat Kumar, Scotch Plains, NJ (US); Daniel Francis Lieuwen, Somerville, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/387,571

(22) Filed: Aug. 31, 1999

(51) Int. Cl.$^7$ ................................................ G06F 15/16

(52) U.S. Cl. ...................... 709/217; 709/202; 709/219; 709/229; 707/501

(58) Field of Search ................................ 709/200–203, 709/217–219, 227–229; 707/500–501; 345/807

(56) References Cited

U.S. PATENT DOCUMENTS

| | | | | |
|---|---|---|---|---|
| 5,727,129 A | * | 3/1998 | Barrett et al. ................ | 709/217 |
| 5,761,436 A | * | 6/1998 | Nielsen ........................ | 709/245 |
| 5,809,250 A | | 9/1998 | Kisor et al. .................. | 709/227 |
| 5,937,163 A | * | 8/1999 | Lee et al. ..................... | 709/217 |
| 6,112,212 A | * | 8/2000 | Heitler ......................... | 707/501 |
| 6,145,000 A | * | 11/2000 | Stuckman et al. ........... | 709/219 |
| 6,151,630 A | * | 11/2000 | Williams ...................... | 709/217 |
| 6,330,596 B1 | * | 12/2001 | Stuckman et al. ........... | 709/219 |
| 6,405,238 B1 | * | 6/2002 | Votipka ........................ | 709/203 |

FOREIGN PATENT DOCUMENTS

| | | | | |
|---|---|---|---|---|
| EP | | 077586 A | 6/1997 | ........... G06F/17/30 |

OTHER PUBLICATIONS

Sastry, et al., "Webtour: A System To Record And Playback Dynamic Multimedia Annotations On Web Document Content", Proceedings of the 7$^{th}$ ACM International Conference (Part 2) On Multimedia (Part 2), Oct. 1999, pp. 175–178.

European Patent Office Search Report, Application No. EP 1081607A3, The Hague, Aug. 20, 2001.

"Individual: Track Changes On The Web," from NetMind found on netmind.com/html/individual.html (2 pages). No date.

(List continued on next page.)

Primary Examiner—Bharat Barot

(74) Attorney, Agent, or Firm—Stephen M. Gurey

(57) ABSTRACT

Shortcuts to Web pages that require multiple steps to be retrieved are enabled by means of a smart bookmark. A smart bookmark is a stored sequence of browsing steps performed by a user, that have been recorded in a transparent manner and which can be automatically played and replayed later when the smart bookmark is accessed. When a user elects to create a smart bookmark, a Java recorder-player applet is invoked that starts the recording process. When the recording process is started and an initial URL is inputted by the user, the responsive Web page at that URL downloaded into the browser is modified to attach event handlers to each element in that page that is associated with actions that the user may take. Each user's click, link traversal to another URL, or input of values to those elements on a form submission are automatically recorded as part of the smart bookmark under creation. The resultant information at each step is recorded in a file. When the smart bookmark is later accessed, the recorder-player Java applet reads the file, and the sequence of recorded steps is played back, including information associated with all link traversals and form submissions. During playback, each intermediate Web page optionally can be displayed in the user's browser, or only the last page can be displayed. Further, during playback, transitions between successive steps can be automatic or can require an input from the user before a next step in the sequence is made.

34 Claims, 11 Drawing Sheets

OTHER PUBLICATIONS

"Individual: What You Can Track," from NetMind found on netmind.com/html/tracking_features.html (3 pages). No date.

"Individual: How You're Notified," from NetMind found on netmind.com/html/notification_options.html (2 pages). No date.

"Individual New Mind-it 3.0 Features," from NetMind found on netmind.com/html/newmindit.html (2 pages). No date.

"Products: Free Mind-it Service," from NetMind found on netmind.com/html/free_mind-it_service.html (2 pages). No date.

"Products: Mind-it Factsheet," from NetMind found on netmind.com/html/mind-it_factsheet.html (2 pages). No date.

"Silktest: Automated functional and regression testing," (10 pages)—Product information from Segue Software. No date.

"Silktest: Automated functional and regression testing," (5 pages)—Product information from Segue Software. No date.

"The Fastest Way to Test the Quality, Scalability, and Availability of Web Applications," e-Test™ suite (8 pages)—Product information from RSW Software. No date.

* cited by examiner

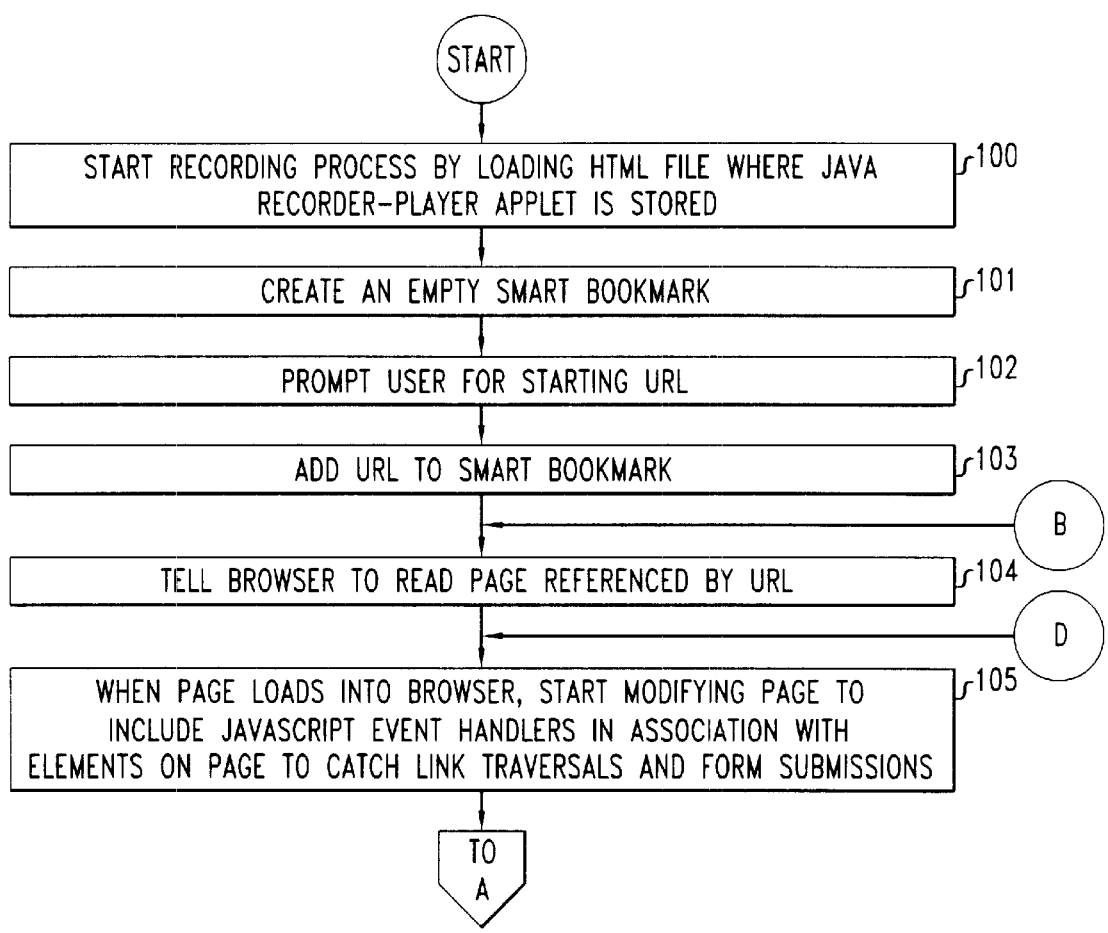

FIG. 2

200 {
- 201 { 1. http://www-db-in/~bharat/
- 202 { 2. Link:
  - text: Test Area (ignore)
  - href: http://www-db-in/~bharat/src/events/form.html
  - target: null
  - loc: opener.document.links[8]
- 203 { 3. Link:
  - text: Frames
  - href: http://www-db-in/~bharat/src/events/frames.html
  - target: null
  - loc: opener.document.links[0]
- 204 { 4. Link:
  - text: Chapter 2
  - href: http://www-db-in/~bharat/src/events/chapter2.html
  - target: contents
  - loc: opener.frames[0].document.links[2]

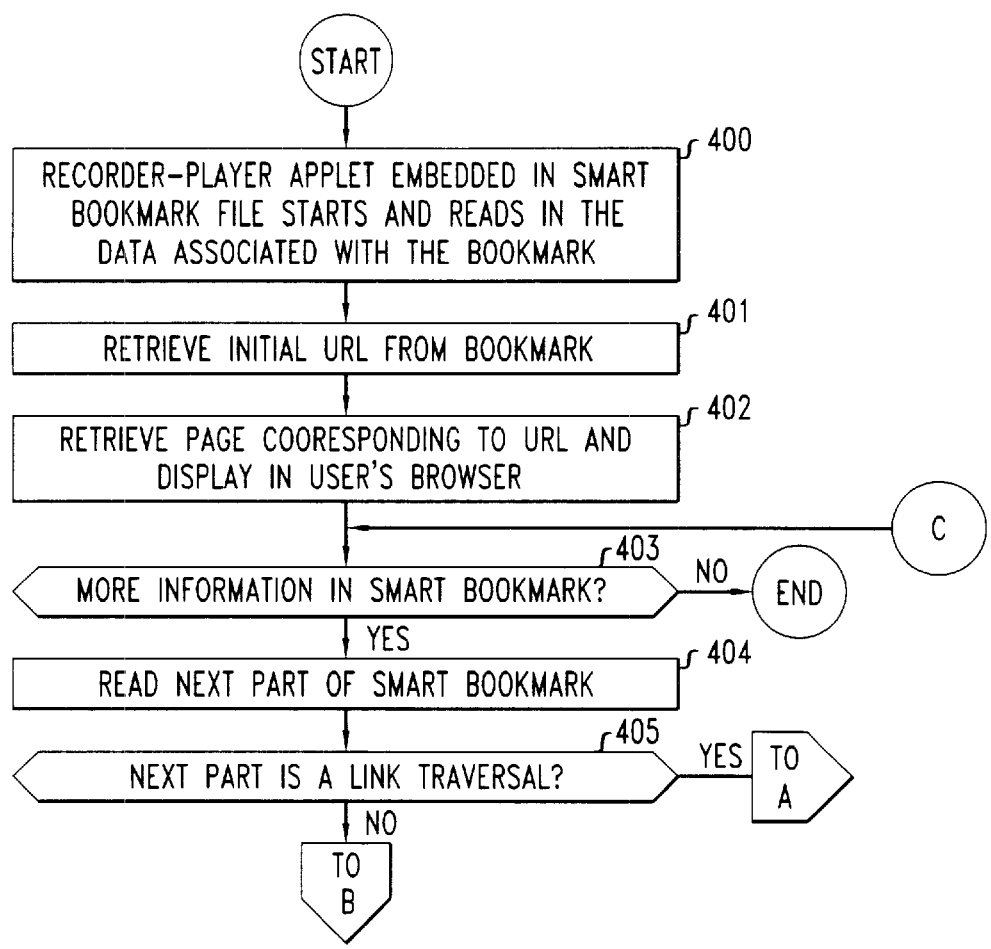

METHOD FOR CREATING AND PLAYING BACK A SMART BOOKMARK THAT AUTOMATICALLY RETRIEVES A REQUESTED WEB PAGE THROUGH A PLURALITY OF INTERMEDIATE WEB PAGES

TECHNICAL FIELD

This invention relates to the World Wide Web and, more particularly, to the retrieval of Web content from Web sites.

BACKGROUND OF THE INVENTION

Web browsers, such at the Netscape® browser and the Microsoft Internet Explorer® browser, enable a user to "bookmark" a Web site that he or she is likely to frequently "visit". By clicking on an appropriate button, the URL of the Web page the browser has last accessed is stored, thereby enabling the user to return to that page at some later time by merely clicking on a representation of that Web page in a bookmark file that is easily accessed from the browser program. Advantageously, the bookmark provides a shortcut to that page and the user does not have to either type in the URL or locate a link to that page from another site. The user can thus quickly visit each of his favorite Web sites/pages by merely clicking on those Web page names in a pull-down bookmark or favorites menu on his browser.

Recent developments in Web technology such as the inclusion of scripting languages, frames, and the growth of dynamic content, have made the process of retrieving Web content more complicated. For example, frames-based Web sites hide the URLs of pages displayed in frames, thus preventing the user from bookmarking the corresponding page. Also, some Web sites require the user to go through a series of interactive steps in order to eventually reach a page that contains data that is of interest to the user. For example, in order to obtain balance information in one's retirement account over the Internet the user must first access the home page of his retirement account manager's Web site. The user must then login at this Web site, and fill out a form that requests user information such as the user's identity via his social security number and a password. Only after that information is uploaded and verified at the Web site, is the user's current balance information provided on a Web page created for that user. Current browser technology does not enable creation of a shortcut to such data. Many other examples could be given that require selection by one or more clicks on a button, link traversals, and/or input of information and/or selections from menus by the user before the user is presented with the information he really wants to obtain.

SUMMARY OF THE INVENTION

The present invention allows users to create smart bookmarks, i.e., shortcuts to Web pages that require multiple steps to be retrieved, or for which the user desires to successively retrieve multiple pages. The invention includes techniques for creating, storing and retrieving a smart bookmark. In accordance with the invention, a smart bookmark is a stored sequence of browsing steps performed by a user, that have been recorded in a transparent manner and can be played later when the smart bookmark is accessed. Such later playback can automatically and sequentially step through each browsing step until the last page is retrieved, or it can wait at each or selected page Web pages to await a user input to continue with the sequence. This mechanism thus allows users to save shortcuts to Web pages that do not have a well-defined, or static, URL, and/or to program a sequence of Web pages that he wants to retrieve on a regular basis. Advantageously, the smart bookmark can either be saved locally, allowing the user who created the bookmark to later retrieve it, or it can be stored at a remote server in the network at a location accessible to other users.

In the specific embodiment of the present invention, when a user elects to create a smart bookmark, a Java recorder-player applet is invoked that starts the recording process. All recording is performed in a transparent fashion, thus requiring no special action by the user besides his or her (hereinafter his for brevity's sake) usual browsing activities. An empty smart bookmark is created and the user is prompted for the starting URL address of the first Web page in the sequence of the multi-step sequence that comprises the smart bookmark. When the requested Web page is loaded into the user's browser, the page is modified to attach Javascript-coded event handlers to each element in the page associated with actions that the user may take on that page. Thus, for example, an event handler is attached to all link traversals, form submissions and button clicks that the user may make from that first Web page. These Javascript-coded event handlers function to notify the Java recorder-player applet upon a user's action. Thus, each user's click, link traversal to another URL, or input of values to those elements on a form submission are automatically recorded as part of the smart bookmark under creation. Advantageously, to protect sensitive information which the user may not want stored directly in the smart bookmark, such as, for example, a user's credit card number, values of selected elements can be stored in either plain text, in an encrypted form, or not stored at all. For the latter case, during later playback of the smart bookmark, the user is prompted to input any non-stored element values as they are needed.

After the user clicks on a button, initiates a link traversal, or submits a form, and the user's action is recorded by the Java applet as part of the smart bookmark, the responsive Web page to such user action is loaded into the browser and the process continues with event handlers then being associated with each element on that new page. The URL of that new Web page and the responsive user actions are recorded, and the process continues. When the last Web page of the desired sequence is loaded, the user saves the smart bookmark by creating an HTML file that embeds the recorder-player Java applet, or reference to such applet, together with data that represents the smart bookmark steps. Alternatively, a file that contains only the smart bookmark steps can be saved.

The HTML file is accessed when the user who created the smart bookmark, or another user, wants to retrieve the last or an intermediate Web page reached through the sequence of steps stored in the smart bookmark. When that HTML file is accessed, the recorder-player Java applet embedded in the file, or referenced in the file, is initiated to read in the bookmark data. The Web page corresponding to the URL of the first part of the smart bookmark is retrieved and optionally displayed on the user's browser. The next part of the smart bookmark file is then read. If the next part is a link traversal, a matching function based on the recorded link position, text and URL in the smart bookmark, along with corresponding properties of links present in the last Web page retrieved in the previous step during playback of the smart bookmark, is used to determine the best match for the link that should now be traversed for the current step. This makes the play functionality more robust with respect to changes in the Web page structure that may have occurred between the time the smart bookmark was created and the current time when the smart bookmark is being played. The page corresponding the best matching URL is then retrieved and optionally displayed in the target window that may be specified in the bookmark. If the next part of the smart bookmark file is a form submission, a similar matching function is used to determine which form to submit. The value of each element in that form is determined from either the value stored in the bookmark data for that element, is decrypted from the value stored in the bookmark data, or is determined from a user's input in a pop-up window that requests input by the user of that element value. Certain elements retain the values set by the server generating that Web page. Once all the element values of the form submission have been determined, the form is automatically submitted to the Web server requesting it, and the resultant Web page is optionally displayed by the browser to the user. This resultant Web page may be the ultimate and final destination of the smart bookmark, or it itself may include link traversals, or include another form, the data associated with either being determined from the smart bookmark data and/or user input until, eventually, the Web page associated with the last step of the smart bookmark is displayed by the browser.

During playback, as each part of the smart bookmark is retrieved, it can either stop as each Web page is read, to await a user's input to continue, it can automatically and sequentially process each part, without awaiting a user's input, or can await a user's input at selected parts and automatically process other parts. Further, during playback, the user can be given the option to pause at each or selected parts, and then later resume either step-by-step or automatic sequential processing.

If the file that has been saved contains only data corresponding to the recorded browsing steps, a user can start a player applet or application, load the desired file, and instruct the applet or application to play the steps in the manner just described.

The present invention can be implemented as a client-based operation where the smart bookmark recorder-player Java applet, individual recorder and player applets, or a single or separate recorder and player applications are embodied on the user's local machine together with a local smart bookmark database that stores one or a plurality of recorded smart bookmarks and which can be accessed by the user. Alternatively, the present invention can be implemented on Web server where the smart bookmark recorder-player Java applet, separate applets, or applications reside and which can be downloaded by a user for creating and playing a smart bookmark. When created, the bookmark can be stored locally on the user's own machine, or can be uploaded to that same Web server in the network for storage thereon, or to any other Web server, where it can also be stored. In order to replay a locally stored bookmark, if already downloaded, the recorder-player Java applet, separate player applet, or application, is invoked and the smart bookmark is played locally. If not already downloaded, the applet or application can be downloaded and the smart bookmark played. If the smart bookmark is stored on a Web server, it can be downloaded onto the user's local machine and played locally using a locally stored or downloaded recorder-player applet, player applet, or application. Alternatively, the smart bookmark can be played on the server where it is stored and the results sent back to the requesting user.

BRIEF DESCRIPTION OF THE DRAWING

FIGS. 1A–1D, hereinafter collectively referred to as FIG. 1, are a flowchart detailing the steps of recording a smart bookmark in accordance with the present invention;

FIG. 2 is a first illustrative example of information incorporated within a smart bookmark;

FIGS. 4A–4D, hereinafter collectively referred to as FIG. 4, are a flowchart detailing the steps of playing back a smart bookmark in accordance with the present invention.

DETAILED DESCRIPTION

Figure 1B:
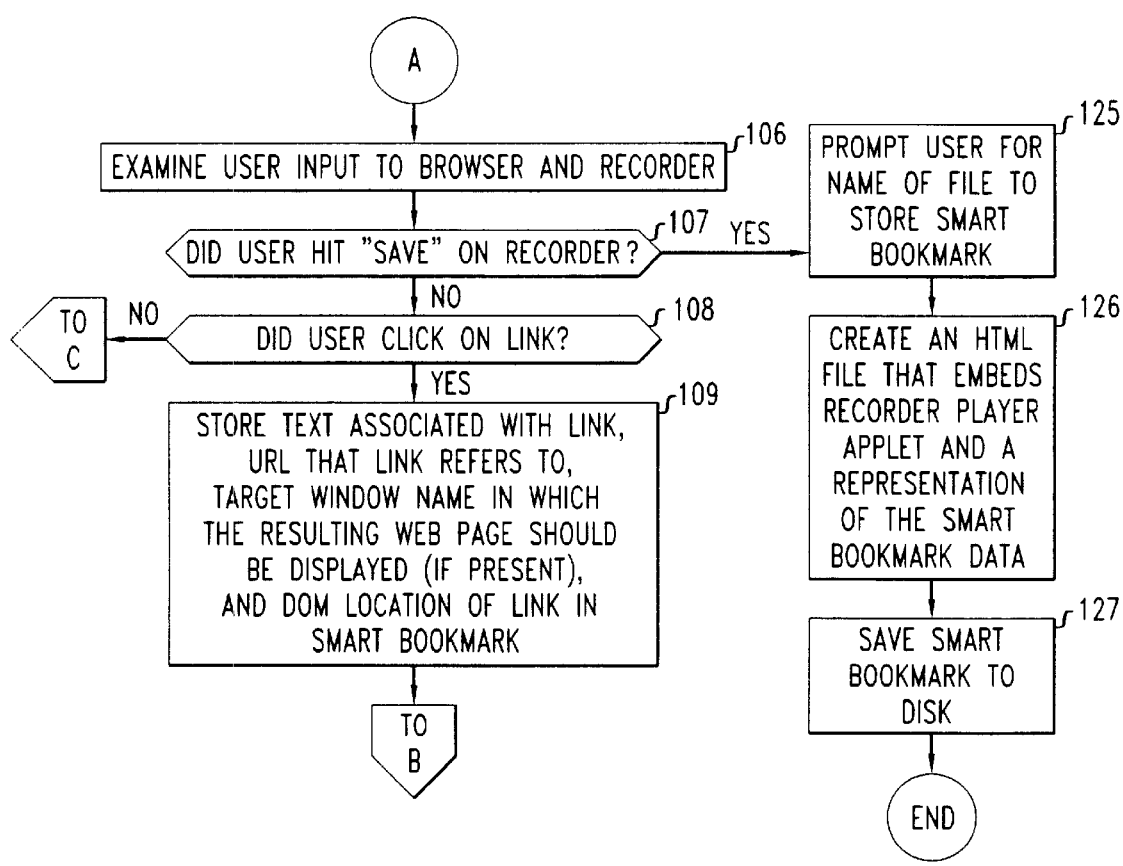

In the specific embodiment of the invention described hereinafter, the smart bookmark recorder and player functionalities will be described as being performed locally on a user's client. Further, for purposes of discussion, it will be assumed that the such recorder and player functionalities are embodied in a single recorder-player Java applet that is activated by the client's browser when creating and later playing a smart bookmark. It should be readily apparent to one skilled in the art that separate recorder and player applets could also be used. Further, a single recorder-player application or separate recorder and player applications running on the client, rather than applets associated with the client's browser, could also be employed to perform the recording and playing functions of creating, storing and playing the smart bookmark.

The flowcharts described below, firstly detail the steps performed in recording a sequence of user steps as the user interactively proceeds from page to page from an initial Web page at an inputted URL to an ultimate destination Web page reached through what may be a series of link traversals and/or form submissions. For purposes of simplicity, button clicks on a Web page are not described separately from form submissions. It should be readily apparent to one skilled in the art that a user's button click can be recorded in a similar manner as that described below for form submissions. The flowcharts secondly detail the steps performed when a user later requests playback of a previously recorded smart bookmark to retrieve the information only available to the user through the sequence of link traversal and form submission steps recorded in the smart bookmark.

As previously noted, the present invention can find particular application to access pages that cannot be bookmarked in a conventional manner. There are various scenarios under which pages cannot be bookmarked. Examples of such include obtaining Web content from a site that is available only after a user logs onto a site, or returning to a frame-based layout where the user has navigated within a frame, or re-obtaining pages generated with session ids encoded in the URL or embedded inside pages where once the session has timed-out, the page can no longer be accessed via the URL.

An example of a scenario of where a shortcut to obtain content would be useful is a user who is looking to purchase a specific type of used automobile having certain constraints with respect to the auto's age, cost and mileage. In order to obtain information about available used cars for sale that meet the desired criteria, the user might first go to a general online Web site that provides a link to classified ads on its home page. Thus, the user first inputs the URL of the online site and selects a link traversal to, for example, a classified ads page. When the browser displays that Web page, the user selects a link traversal to those ads relating to used automobiles. Upon download of that page into his browser, the user selects a link traversal to an auto search page. Once his browser downloads and displays that page, the user specifies on a form, using, for example, a pull down menu, the type of automobile he is interested in. On a responsive Web page, the user is presented with a form to specify via a combination of pull-down menus and fill-in attributes, his year, mileage and price constraints. This series of steps produces a Web page of possibly relevant cars for sale that satisfy these constraints. It is unlikely, however, that a single visit to this page will be sufficient for the user to find an acceptable car. More likely, he will need to repeatedly visit this same Web site many times until he locates an acceptable car. By creating a smart bookmark in accordance with the present invention, the user can automatically go directly to the Web page containing the most current automobiles for sale that meet his criteria without having to manually go through the intermediate steps of link traversals and form submissions as initially performed to access that information. Thus, in accordance with the invention, when the user initially, through his browser, goes through the sequence of steps from firstly inputting the URL of the online site, making link traversals, and filling-in and submitting forms, those user actions are recorded in a file and made available to that user for playback at a later time.

Figure 1C:
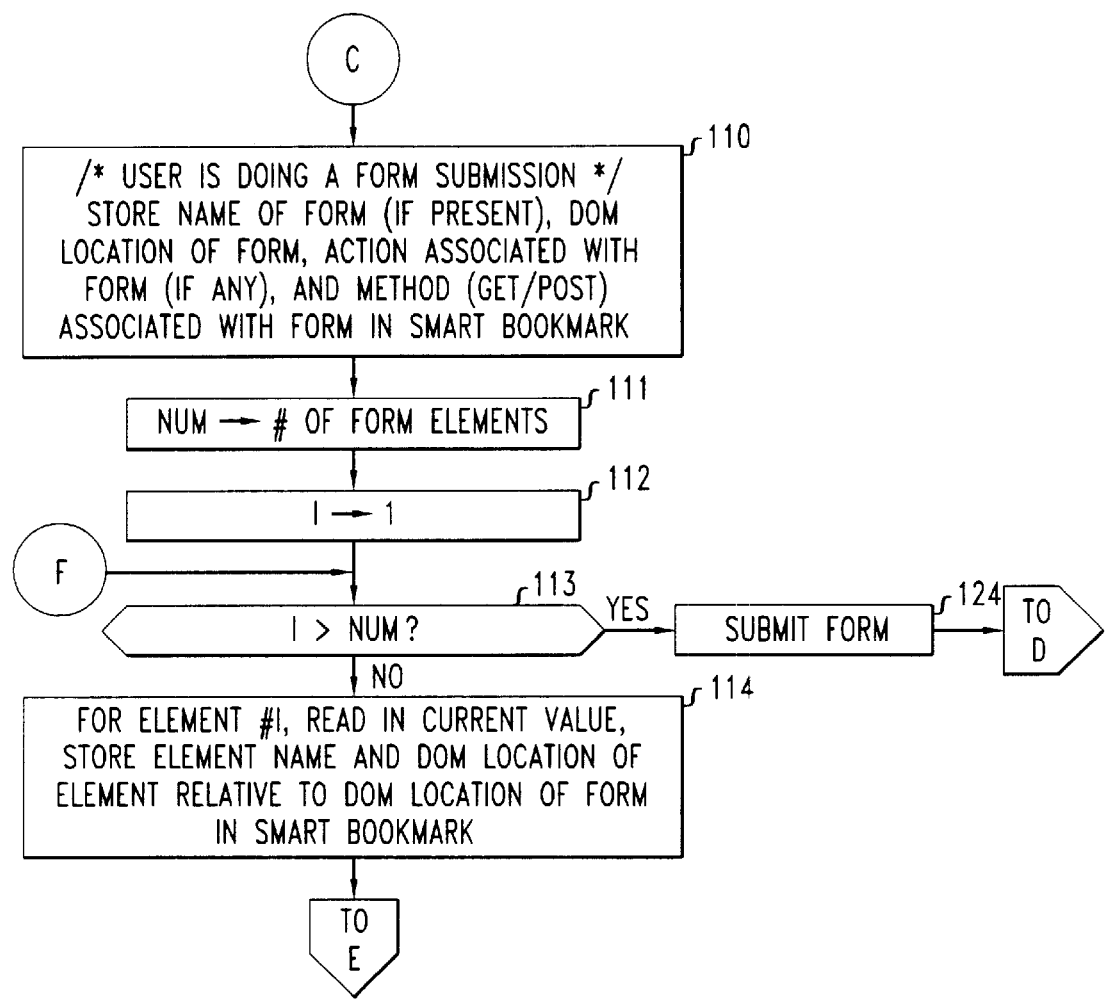
Figure 1D:
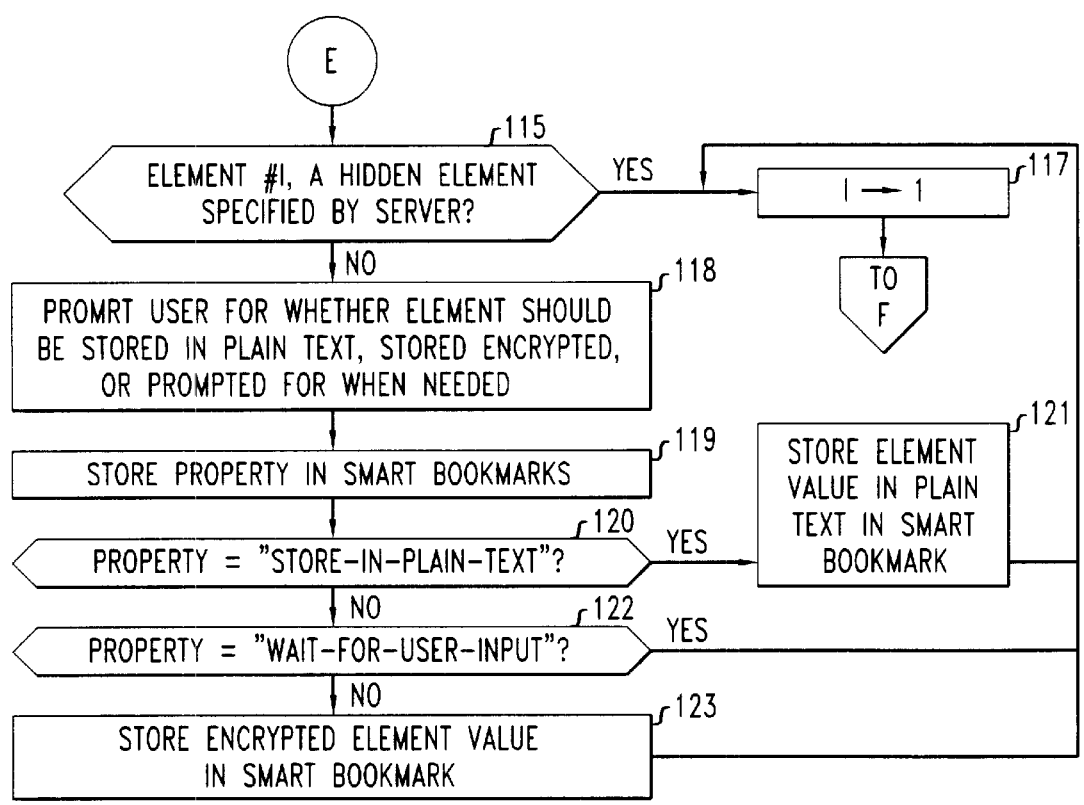

The steps of recording a smart bookmark are described in conjunction with the flowchart in FIG. 1. At step 100 the recording process is started by the user by initiating the Java recorder-player applet by loading an HTML page where the applet is embedded, which page is stored on the user's client and is accessible via the client's browser. When the HTML page is loaded, the applet is started in a new browser window. At step 101, when the applet starts it creates an empty smart bookmark instance. The applet is then activated to track the user's browsing actions within the original browsing window. At step 102, the user is prompted by the applet to enter the starting URL of the smart bookmark. At step 103, that entered URL is added to the smart bookmark, and, at step 104, the browser reads the Web page referenced by that URL. At step 105, when the page at that URL is loaded into the browser, the Java applet, using the Document Object Model (DOM) API supported by the browser to access and modify that page, installs event handlers on the individual elements on that downloaded HTML page. As is well known in the art, an event handler consists of code in a scripting language, such as Javascript, that is executed when a specific user interaction takes place. The Javascript event handlers installed on the elements of the page are programs that are responsive to the user's link traversals, form submissions, and clicks on any button in general, and include code that informs the Java recorder-player applet when the user selects an event of what the event was and information relating to the event. Thus, each event handler informs the applet that a certain element has been activated, and the attributes of that element such as, if the element is a link, the target window/frame where the corresponding responsive page is to be displayed, the URL of the link, the text associated with the link on the current page, and the DOM location of the link on the current page. If the event is a form submission, the properties of that form are recorded by the applet. Example form properties include the form name, a method of submission (e.g., GET or POST), a target frame/window for the response, the action to be invoked when the form is submitted (e.g., invocation of a URL, or a cgi script), the DOM location of the form on the current page. Also recorded, for each element in the form, are the corresponding properties of that element such as the name of the element, the location of that element within the form, the type of element (e.g., text, password), and one or more values associated with that element.

To enable the recorder-player applet to track a user event, access any Web page via the DOM API, and save smart bookmark files in the user's local machine or elsewhere, the recorder-player applet and any associated Javascript code must be "signed" by the applet creator. When the user then starts the applet for either recording or playing, the applet will request from the user certain privileges to enable it to perform the above-described actions, such as recording/saving a smart bookmark.

After the Web page at the first URL is downloaded by the browser and its URL is recorded in the smart bookmark file, the user, via the browser, takes an action that is presented on that Web page or within a recording window that has been opened. Such action on the downloaded Web page may either be a link traversal, or a form submission (for purposes of discussion herein, it is assumed that link traversals and form submission are the only actions for traversing one Web page to another, and that button clicks and/or the like will not be separately considered). Such action on the recording window would be clicking on a "save" button to save the steps of the bookmark already accumulated as the complete smart bookmark. At step 106, the user input to the browser and the recorder windows is examined by the applet and the applet responds to that action to determine what that action is and to record the action and information about the action via its associated event handler. At step 107, a determination is made whether the user at that point hit a "save" button within the recorder window to save a completed smart bookmark. If not, at step 108, a determination is made whether the user's action was a click on a link to effect a link traversal. If yes, at step 109, the text associated with the link, the URL that the link refers to, the target window/frame name in which the resulting Web page should be displayed (if present), and the DOM location of the link on the current page are stored in the smart bookmark. The browser then returns to step 104 to read the Web page referenced by the URL of that link. The process then continues again at step 105, with event handlers being installed in association with each element on that linked page.

If, in the user input examined in step 106, the user neither hit the "save" button within the recorder window (determined at step 107), nor clicked on a link (determined at step 108), then, at step 110, it is determined that the user performed a form submission. The applet then stores in the smart bookmark the name of the form (if present), the DOM location of the form on the page, an action associated with the form (if any), and a method (GET or POST) associated with that form. Information is then determined for each element in the form. At step 111, the number (NUM) of elements within the form is determined. At step 112, a form element number, I, is initialized at 1. At step 113, the current form element number, I, is compared with NUM. If I is less than NUM, at step 114, for element number I, the current value of that element is read in and the element name and DOM location of that element relative to the DOM location of the form is stored in the smart bookmark. If, at step 115, element number I is a hidden element that is specified by the server generating the form page rather than by user input, then the element is not stored in the smart bookmark. The element number I is then incremented by one at step 117, and information about the next element number within the form is determined. If element I is not determined to be a hidden element at step 115, then, at step 118, the user is prompted to assign a property that is associated with that element. The property can be: (1) store the element value in plain text; (2)

encrypt and store the encrypted element value; or (3) don't store any element value and prompt the user when the smart bookmark is replayed. Thus, if the form requires an input of a user's identity or password for one or more elements, which the user does not want incorporated into the smart bookmark, in recording the smart bookmark, such elements are assigned the property of "store-in-encrypted-form" or "wait-for-user-input". The property selected by the user for such an element is then stored, at step 119, in the smart bookmark. If, at step 120, the property selected for current element I is "store in plain text", then, at step 121, the current element value (either entered by the user, or the existing default value) on the form is stored in the smart bookmark. The element number I is then incremented by one at step 117. If, at step 122, the property selected by the user is determined to be "wait-for-user input", then the current element value is not stored in the bookmark and the element number I is incremented by one at step 117. If the property selected for the current element I is neither "wait-for-user input" nor "store-in-plain-text", then, at step 123, the property of the current element value inputted by the user is "store-in-encrypted-text" and the current element value is encrypted (with a default encryption key, or an encryption key supplied by the user) and stored in the smart bookmark. Again, at step 117, the element number I is incremented by one.

After the current element value is either stored in plain text, not stored, or is stored in an encrypted manner and the element number I is incremented by one at step 117, the resultant element number is compared, at step 113, with NUM, the number of elements in the form. If I is greater than NUM, information for each of the elements of the form has been stored and the completed form is submitted at step 124. The resultant Web page is then loaded at step 105 and, as previously discussed, event handlers are installed on the resultant page and the recording process continues.

After the browser loads a Web page that represents the user's desired ultimate destination page, the user, at step 107, hits a "save" button within his recorder window. The user is then prompted, at step 125, for the name of a file to store the smart bookmark. At step 126, an HTML file is created that embeds a reference to the recorder-player applet, together with a representation of the smart bookmark data. At step 127, the smart bookmark is saved to disk on the user's client. As will be explained later, the smart bookmark could also be saved on the network at a designated URL. The recording process is then complete. As previously noted, rather than storing an HTML file, the system might only store the data corresponding to the recorded browsing steps.

FIG. 2 is a first example of data 200 that might be stored within a smart bookmark. The bookmark begins at step 1 (201) with the URL of the first page at http://www-db-in/~bharat/. Step 2 (202) is a link to a destination link point at http://www-db-in/~bharat/src/events/form.html. The text associated with the link is "Test Area (ignore)", the target is "null", indicating that the result is to be displayed in the same window/frame from which it originated. Further, the DOM location of the link is opener.document.links[8], meaning that the link is the ninth link on the originating Web page. Step 3 (203) is another link traversal from the page arrived at in step 2 to a destination link point http://www-db-in/~bharat/src/events/frames.html. The associated text with the link is "Frames" and the target is "null". The DOM location of the link is the first link on the originating page. Step 4 (204) is a link traversal from the page arrived at in step 3 to a destination link point http://www-db-in/~bharat/src/events/chapter2.html. The text associated with the link is "Chapter 2" and the result is to be displayed in a target window/frame entitled "contents". The DOM location of that link on the originating page arrived at step 3 is opener.frames[0].document.links[2], indicating that the originating page has a frame format and the link is the third link in the first frame on that page. By clicking on this smart bookmark, therefore, the browser successively proceeds through each of these steps to the link in step 4 and displays the result in a frame entitled "contents".

Figure 3:
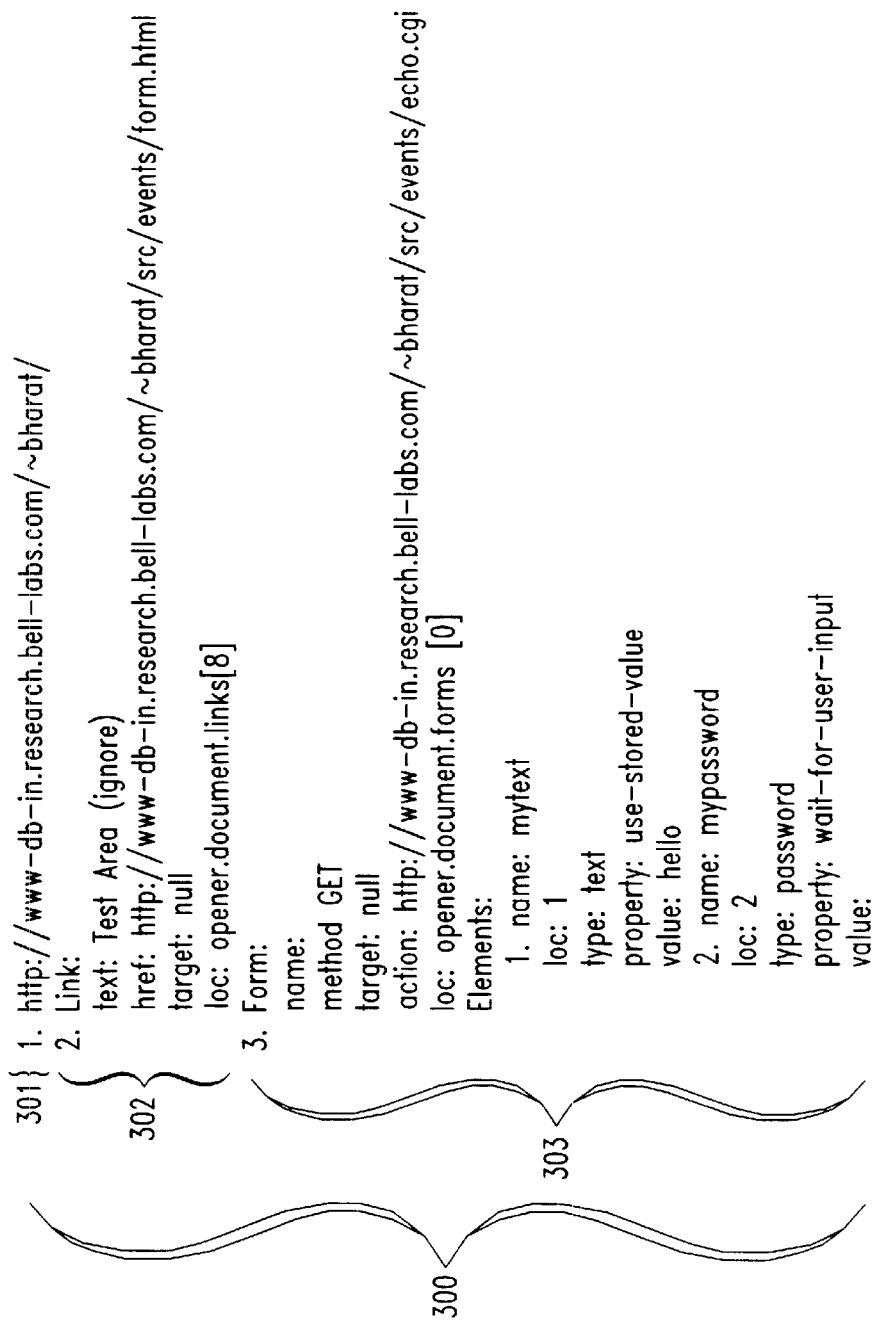
FIG. 3 is a second illustrative example of the information incorporated within a smart bookmark.

FIG. 3 is an second example of data (300) that might be stored within a smart bookmark which includes both a link and a form submission. Step 1 (301) specifies the originating URL, http://www-db-in.research.bell-labs.com/~bharat/. Step 2 (302) specifies a link to a destination link point http://www-db-in.research.bell-labs.com/~bharat/src/events/form.html. The text associated with this link is "Test Area (ignore)", the target window/frame is "null", and the location of the link is the ninth link on the originating page. The resultant page includes a form. As specified in step 3 (303), the form does not have any name associated with it. The method of submission is GET and the target window/frame is "null". The DOM location of the form on the originating page is opener.document.forms[0], indicating that it is the first form on the page. The action to be executed on the web server upon submission of the form is given by http://www-db-in.research.bell-labs.com/~bharat/src/events/echo.cgi indicating that the program echo.cgi is to be executed when the form and the corresponding element values are submitted to the corresponding Web server. There are two user-inputted elements associated with the form. The first numbered element has an internal name "mytext" associated with it, and the second numbered element has an internal name "mypassword" associated with it. The DOM location of the first numbered element is loc: 1, indicating that it is the second element in the form, and the DOM location of the second numbered element is loc: 2, indicating that it is the third element in the form. Implicit with this is that a first form element is a hidden element, the value of which is obtained from the server. The type of the first numbered element is "text". Other types of elements can include passwords, checkboxes, radio buttons, selection lists, buttons, hidden, etc. The type of the second element is "password". The property of the first numbered element is "use-stored-value" meaning that the text inputted by the user during creation of the bookmark is stored and submitted to the Web server during playback of the smart bookmark. On the other hand, the property of the password in the second numbered element is "wait-for-user-input". Thus, the user-inputted password value is not stored in the smart bookmark. During playback of the smart bookmark, therefore, the user will be prompted to enter his password, which user-inputted value is submitted to the Web server as the value of the second numbered form element.

Although the description hereinabove described recording a smart bookmark that contained a sequence of browsing steps at Web sites that are connected through link traversals and/or form submissions, it should be apparent to one skilled in the art that a smart bookmark in accordance with the present invention can also include a sequence of one or more independently entered URLs. Such independent URLs can be manually entered by the user during the recording process, or retrieved by the user from a conventional prior art bookmark file during the recording process. A smart bookmark can comprise either all independent unconnected URLs, can be a combination of unconnected URLs and browsing steps via link traversals and/or form submissions between connected URLs, or, as previously described above, all connected browsing steps via link traversals and/or form submissions. By storing a series of unconnected URLs within a smart bookmark, a user can thus program a sequence of those unrelated Web sites that he might visit on a regular basis. When such a smart bookmark is later played back, the user can then proceed step-by-step through each URL as it is displayed on his browser without having to separately enter the URL of a next Web site or repeatedly access his prior art bookmark file in order to click on the next Web site.

Figure 4B:
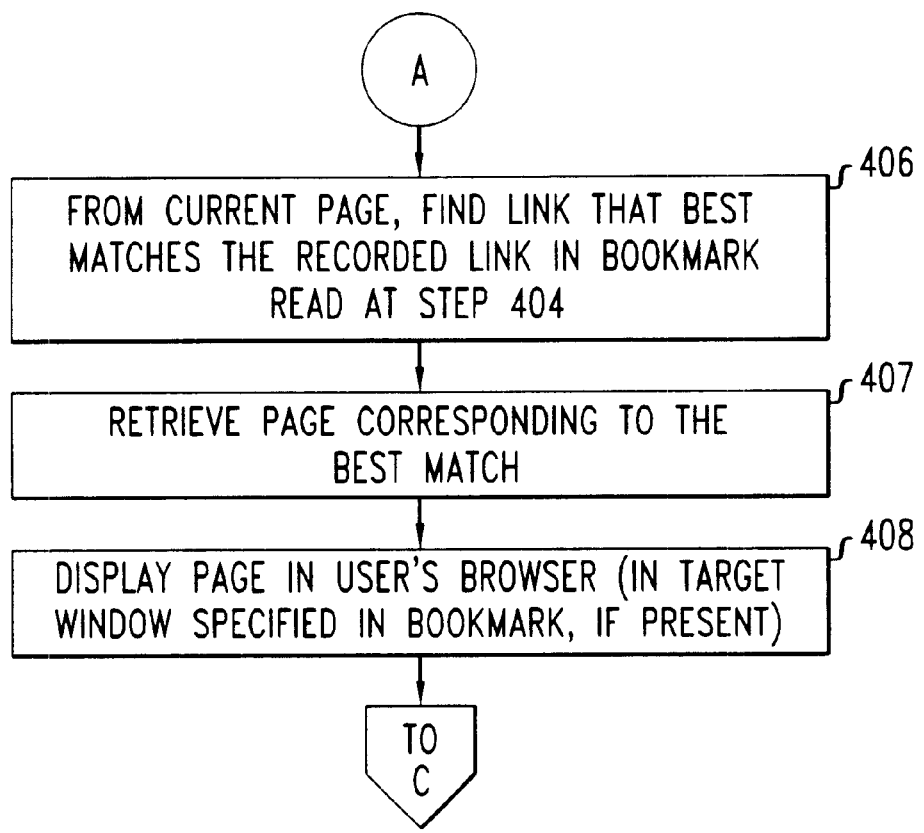
Figure 4C:
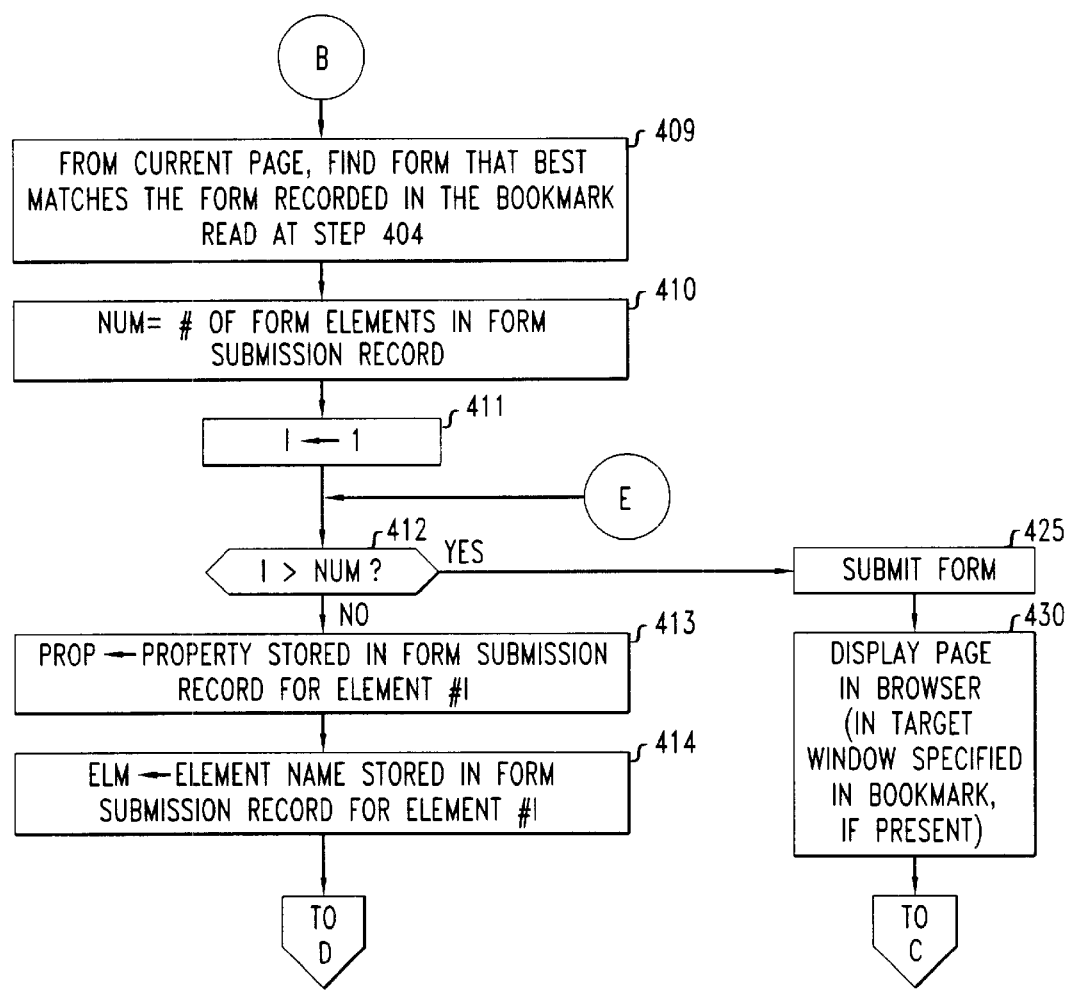
Figure 4D:
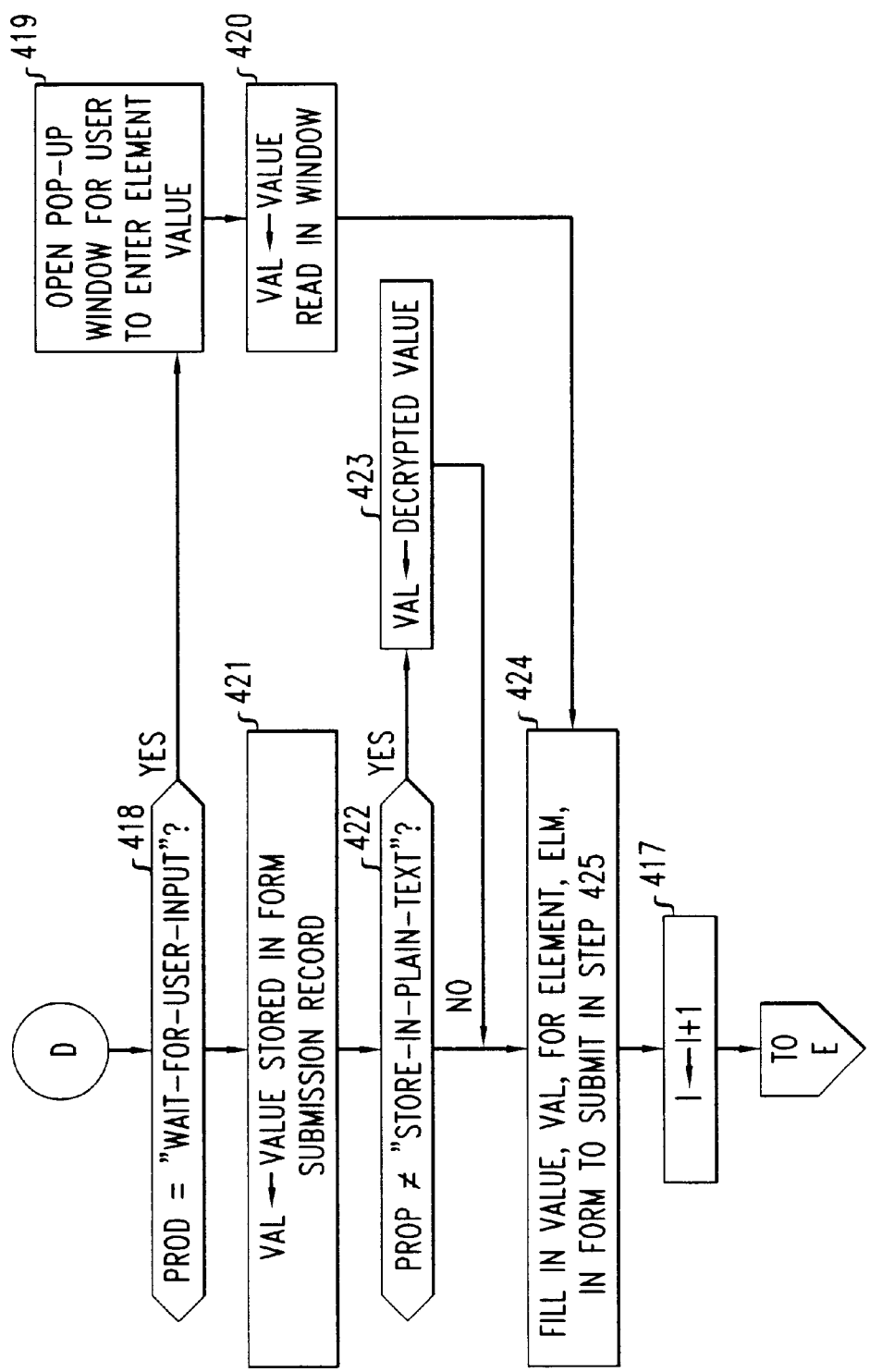

In order to play a recorded smart bookmark, the user loads through his browser the HTML page containing a reference to the recorder-player applet and the data associated with the steps within the smart bookmark. (It has been assumed in this embodiment, that each page is displayed in the browser. In an alternate embodiment, only the final page would be displayed) With reference to the flowchart of FIG. 4, at step 400, the HTML page is read and the applet referred to in that page is read in and invoked. The applet then reads in the bookmark data. At step 401, the initial URL is retrieved from the bookmark. At step 402, the Web page corresponding to that URL is retrieved and displayed in the user's browser. At step 403, a determination is made whether there is more information in the smart bookmark. If the smart bookmark contains additional information, at step 404, the next part of the smart bookmark is read.

A determination is made, at step 405, whether this next part of the smart bookmark is a link traversal. If yes, at step 406, from the current page from which the link traversal is to be made, a link is found that best matches the recorded link in the just read bookmark at step 404. Since Web pages change frequently, the recorded URL in the smart bookmark might not actually be the link that the user is desirous of reaching when he later plays the bookmark back. For example, many sites display different ads each time their page is visited. It is not uncommon for multiple ads to be present or absent at any given time. In addition, some Web content is updated constantly. For example, the main page for news.com displays links to multiple news categories. On different days, even though the label on the link remains the same, the URL to which it points changes. These changes do not pose a problem to a user browsing the Web since the user can visually determine what link he desires to take, but they do present a challenge to a system that performs automatic navigation. For example, it can be assumed that a link traversal in a smart bookmark is about to be played and the play procedure uses the DOM signature of the link (e.g., link[0] is the DOM signature of the first link in a given Web page) to identify in the current page which link to follow. If new links have been added to the page since the smart bookmark was recorded, the intended link destination may have moved. For example, what was link[0] when the smart bookmark was created from the original originating page may now be link[2] on the current version of that page. Thus, if a link traversal to link[0] is chosen during playback of the smart bookmark, the resultant navigation will be to the wrong page.

The smart bookmark playback process could also use the URL or the link label (that is displayed in the browser). These could also lead to incorrect navigation. As an example, a user may want to create a smart bookmark to a specific current news category at a Web site news.com such as to "One Week View". If, in creating the bookmark, the URL of the then current page is stored, and during playing of that bookmark one week later that stored URL is used, the link will no longer be found since a different page at a different URL will be the "One Week View" page for the then current week. In this case, using the label of the link would have the desired effect. There are instances, however, where labels may also be inaccurate. If, for example, a user wants a smart bookmark to the CNN headline story, both the URL and label of the headline may change multiple times a day. For example, whereas currently the label of a link may read "Hopes face, frustration grows in Turkey after deadly quake", with the URL pointing to http://www.cnn.com/WORLD/europe/9908/18/turkey.quake.03/, the label one hour previous may have read "Stunned Turks dig for earthquake survivors", with the URL pointing to http://www.cnn.com/WORLD/europe/9908/18/turkey.quake.02/.

Figure 5:
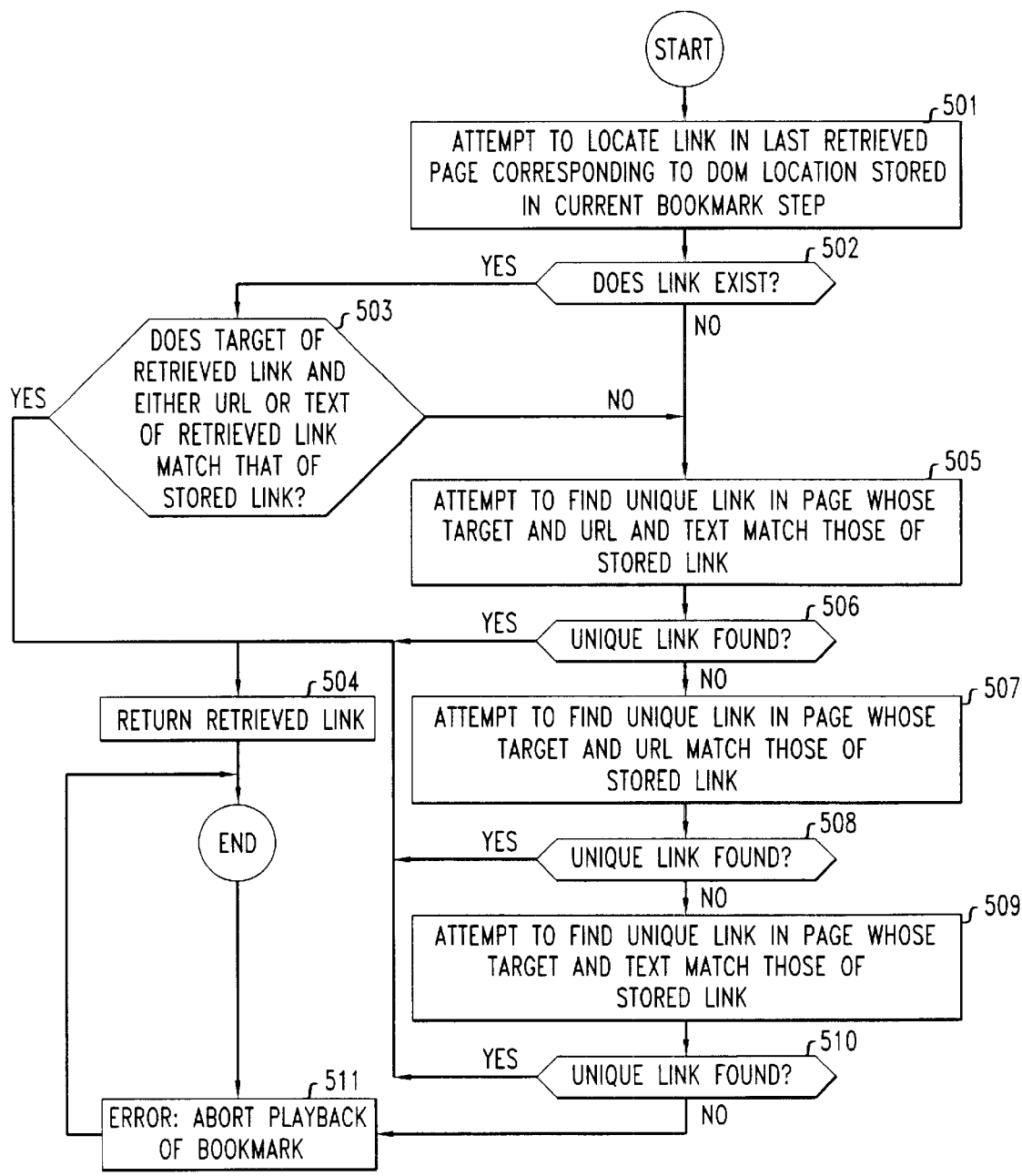
FIG. 5 is a flowchart detailing the steps used during playback of a smart bookmark to provide robustness to the playback of a smart bookmark that incorporates a link traversal from one Web page to another.

A system that implements smart bookmarks needs to deal with these issues in order to be robust to changes in the underlying Web pages and behave as the user expects it to, i.e., the smart bookmark system should navigate the user to the destination the creator of the bookmark intended when the smart bookmark was created. In the embodiment of the invention described herein, heuristics are used to find the "best" match for recorded link and form steps. FIG. 5 is a flowchart showing the steps in a simplified version of the heuristic method used to determine the closest matching link when playing a recorded link traversal. At step 501, an attempt is made to locate a link on the last retrieved Web page in the smart bookmark corresponding to the DOM location stored in the current smart bookmark step. At step 502, a determination is made whether such a link exists. If such a link does exist, at step 503, a determination is made whether the target of that retrieved link and either the URL or the text of that retrieved link match that of the stored link. If they do, then, at step 504, that retrieved link is assumed to be the correct link and that retrieved link on the last retrieved Web page is returned as the link to take. If, at step 503, the target of that retrieved link does not match that of the stored link or both the URL and the text of that retrieved link do not match that of the stored link, at step 505, an attempt is made to find a unique link on the last retrieved Web page whose target and URL and text match those of the stored link in the smart bookmark. If, at step 506, such a unique link is found, then, at step 504, that unique retrieved link on the last retrieved Web page is returned as the link to take. If, at step 506, such a unique link is not found, then, at step 507, an attempt is made to find a unique link on the same last retrieved Web page whose target and URL match those of the stored link in the smart bookmark. If at step 508, such a unique link is found, then, at step 504, that unique link is returned as the link to take. If, at step 508, a unique link is not found, then, at step 509, an attempt is made to find a unique link on the same last retrieved Web page whose target and text match those of the stored link in the smart bookmark. If, at step 510, such a unique link is found, then, at step 504, that unique link is returned as the link to take. If, at step 510, a unique link is not found, then, at step 511, an error condition has arisen and playback of the smart bookmark is aborted. The user can thereafter manually traverse the steps link-to-link. Thus, in accordance with this process, either a link that "best" matches the information in the stored bookmark is returned as the next step in playing the user's bookmark, or continued play-out of the smart bookmark is aborted. The above described just one embodiment of a matching heuristic. More complex heuristics are possible based on, for example, on other technologies such as using path expressions (instead of DOM locations) to specify link positions.

Returning to FIG. 4, following step 406, where a link is returned that best matches the recorded link in the smart bookmark step, at step 407, the browser retrieves the Web page corresponding to that returned "best match" link. At page 408, that page is optionally displayed in the user's browser in the target window specified in the bookmark, if such target window is specified. Following step 408, a return to step 403 is effected to determine whether there is more information in the smart bookmark. If yes, then at step 404, as before, if the next part of the smart bookmark is a link traversal, a best matching link is determined. If not a link traversal, the next part of the smart bookmark then represents a form submission (as previously noted, this embodiment of the invention has assumed that link traversals and form submissions are the only methods of traversing from one page to another). At step 409, therefore, in the page from which a form should be submitted (current page), a form is found that best matches the form recorded in the bookmark step. Thus, using heuristics similar to those described above for link traversals in FIG. 5, a closest matching form is determined. Using the teaching of FIG. 5, one skilled in the art could determine such a closest matching form based on the set of form attributes stored in the bookmark.

Following determination of a best matching form at step 409, at step 410, the number, NUM, of elements in the form submission record is determined. At step 411, form element number I is initialized at one. At step 412, the current value of I is compared with NUM. If I is less than NUM, at step 413, the property, PROP, of element number I is set as the property stored in the form submission record in the smart bookmark for that element number. At step 414, ELM is set as the element name stored in the form submission record for element number I. A determination is made, at step 418, whether PROP is equal to "wait-for-user-input". If yes, then, at step 419, a pop-up window is opened for the user to enter an element value, such as a password. The value, VAL, for that element is then set, at step 420, as the value entered by the user and read in the pop-up window. The value VAL is then filled in for the ELM element of the form in step 424. The process then returns to step 412 and, if I is still less than NUM, the next numbered element is retrieved from the bookmark. PROP and ELM are then determined for this new element number at steps 413 and 414, as before. If, at step 418, the property of element number I is not "wait-for-user-input", then the value of element I, VAL, is set, at step 421, as the value stored in the form submission record of the smart bookmark. If, at step 422, the property PROP for that element number does not equal "store-in-plain text", then, at step 423, VAL is decrypted using a decryption key supplied by the user, or the default decryption key. The value, VAL, for that element in the form is then filled in, at step 424, with that decrypted value. If, at step 422, the property PROP for that element equals "store-in-plain-text", the value for that element is then filled in, at step 424, with that value obtained from the form submission record in the smart bookmark. After the value of that element is filled in at step 424, the element number, I, is incremented by one at step 417.

When, following step 417, the value of I is greater than the number of form elements, all elements in the form have been filled in from the current web page (hidden elements), from user input, or from the smart bookmark. The form, with its filled-in element values, is then submitted to the URL indicated in the smart bookmark, for processing in accordance with the method and action in the stored smart bookmark. The page is displayed in the browser at step 430. Then, if more information is present in the smart bookmark, at step 404, processing continues through link traversal(s) and/or form submission(s). When no more information is present in the smart bookmark, the ultimate smart bookmark destination has been reached and the playback of the smart bookmark is complete.

As described above, when a smart bookmark is played back, each page is played back and displayed in the user's browser. During such playback, each page can sequentially proceed automatically to the next page in the sequence within the smart bookmark. Alternatively, the user may be required to provide an input between each or selected pages before a next page is retrieved. As previously discussed, the smart bookmark may include one or more unconnected URLs. Thus, during playback of a smart bookmark that includes such unconnected URLs, the preferred embodiment would incorporate this stop-before-proceeding aspect to enable the user to digest the information content provided on the retrieved Web page. Further, the user may pause at any time during playback and then later resume either automatic or step-by-step processing of the remainder of the smart bookmark.

If presentation of only the final destination page of the smart bookmark is desired, during playback presentation of the intermediate step pages in the browser would not be required. The browser would then not display these intermediate pages, and only display the final page.

Smart bookmarks are described hereinabove as being recorded and played back with a single common recorder-player applet that is associated with the user's browser. Alternatively, separate recorder and player applets could be employed to record and play the smart bookmark. Further, rather than applets, a single recorder-player application or separate recorder and player applications, or "program" or "programs", referring in general to either applet, application, or any other type of program, could be employed to perform the described recording and playing functions. The single or multiple programs can be stored at the client, as described above, or can be stored on the network. In the latter case, the appropriate program is downloaded into the client when a smart bookmark is to recorded or played. The HTML file containing the data associated with the smart bookmark thus contains a reference to the address of the program that needs to be read in order to play back the smart bookmark.

The recording and playback functionalities could also be performed in the network. The recorded bookmark could then be downloaded into the client for later replay or could be stored in a central database. A smart bookmark, in that case would be made available to a user through a unique id generated by the database. Each smart bookmark would then be accessed through a URL that includes the database site and an encoding of the unique id. Such a URL can then be stored like any other URL in a conventional bookmark and sent as email. Any user could access that URL on a server in the network with which the smart bookmark database is associated. The smart bookmark would then be played on that site and the results sent back to the user who sent the smart bookmark reference to the server. Such a user would thus require no special software running on their client to be able to use the smart bookmark.

Although the description above indicated certain information being stored in the smart bookmark for link traversals and form submissions, it should be readily apparent to one skilled in the art that additional information to that described or a sub-set of the information described could be stored in other embodiments of this invention.

Various enhancements could be made to creating, recording and playing back of a smart bookmark. For example, as described, robustness to smart bookmark playback is provided by a heuristic process that locates a most likely link traversal or form submission from a current page to a next page from the recorded smart bookmark. Extensions to such algorithms could be made that take into account other types of changes than those described on a case-by-case fashion. Such special case treatment may be necessary for pages that may move from one site to another, or for sites that require the user to sign up only once per day with all subsequent interactions on that day bypassing the input of login and password information. An extension to the best matching process would also let the user specify the semantics of smart bookmarks through the control of the behavior of the matching algorithms. For example, through user input, weights could be specified for the various attributes of links and forms to indicate which are the most significant.

As with conventional prior art static bookmarks, a smart bookmark may at sometime become stale and require re-recording by the user. A GUI can be provided that shows the recording/playing progress (e.g., a filled circle for each completed step) that lets users set break points and step through the smart bookmark. The smart bookmark can then be edited and modified by the user through a click on the page of the smart bookmark that he wants to modify.

Although specifically described in connection with link traversals and form submissions on an HTML page, the present invention could be applied to any other type of action on an HTML page or on a page containing any other markup language, such as XML, that provides for the display and/or presentation of information content available on the Web, on any packet-based computer network, or any other computer network in any manner including, for example, visually, audibly or any combination thereof. Such information content may be delivered to the user's client, be it a personal computer, personal digital assistant, or any other device that can accept information content, over any medium including, for example, wireline facilities, wireless facilities, or any combination of such or other facilities. Further, as used herein, page is intended to means any conventional Web page, portion of a Web page or information content in general that can be delivered to any type of terminal that can accept information content.

The preceding merely illustrates the principles of the invention. It will thus be appreciated that those skilled in the art will be able to devise various arrangements which, although not explicitly described or shown herein, embody the principles of the invention and are included within its spirit and scope. Furthermore, all examples and conditional language recited hereinabove are principally intended expressly to be only for pedagogical purposes to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams herein represent conceptual views embodying the principles of the invention. Similarly, it will be appreciated that any flow charts, flow diagrams, pseudocode, and the like represent various processes which may be substantially represented in computer readable medium and so executed by a computer or processor, whether or not such computer or processor is explicitly shown.

In the claims hereof any element expressed as a means for performing a specified function is intended to encompass any way of performing that function including, for example, a) a combination of circuit elements which performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means which can provide those functionalities as equivalent as those shown herein.

The invention claimed is:

1. A method of creating a bookmark for accessing over a computer network a last Web page that is reached by successively accessing in sequence a plurality of Web pages starting with a first Web page, each next successive Web page in the sequence being accessed in response to at least one action on a browser at its previous Web page, the method comprising:
   a) recording at least one action associated with accessing the first Web page from the browser;
   b) loading the first Web page in the browser;
   c) for each next successive Web page until the last Web page is reached, recording the at least one action used to reach that next Web page from its immediate previous Web page and loading that next Web page in the browser, the number of Web pages in the sequence of Web pages from the first to last being allowed to be essentially unconstrained, and other than being linked by the at least one action used to reach each next Web page from its immediate previous Web page, the relationship between each next Web page and its immediate previous Web page being essentially unconstrained; and
   d) storing in a file data associated with the actions recorded in a) and c) so that when the file is read by a player program the first Web page and each next successive Web page until the last Web page are sequentially accessed automatically.

2. The method of claim 1 wherein a next Web page in the sequence is accessed via a link traversal from a link on its previous Web page.

3. The method of claim 2 wherein recording at least one action associated with accessing a next Web page via a link traversal from a link on its previous Web page comprises storing a URL associated with the link.

4. The method of claim 3 wherein recording at least one action associated with accessing a next Web page via a link traversal from a link on its previous Web page further comprises storing a DOM location of the link on the previous Web page.

5. The method of claim 3 wherein recording at least one action associated with accessing a next Web page via a link traversal from a link on its previous Web page further comprises storing a text associated with the link on the previous Web page.

6. The method of claim 3 wherein recording at least one action associated with accessing a next Web page via a link traversal from a link on its previous Web page further comprises storing a target window name where the next Web page will be displayed.

7. The method of claim 1 wherein a next Web page is accessed via a submission of a form on its previous Web page.

8. The method of claim 7 wherein recording at least one action associated with accessing a next Web page via a submission of a form on its previous Web page comprises storing a DOM location of the form on that previous Web page.

9. The method of claim 7 wherein recording at least one action associated with accessing a next Web page via a submission of a form on its previous Web page further comprises storing a method associated with the form.

10. The method of claim 7 wherein recording at least one action associated with accessing a next Web page via a submission of a form on its previous Web page further comprises storing a name of the form.

11. The method of claim 7 wherein recording at least one action associated with accessing a next Web page via a submission of a form on its previous Web page comprises storing an action associated with the form.

12. The method of claim 7 wherein recording at least one action associated with accessing a next Web page via a submission of a form on its previous Web page further comprises:

reading in for each element in the form a current element value;

determining a property for each element as to whether the element value should be stored in plain text, stored encrypted, or is an element whose value should be obtained from a user when it is needed;

storing the determined property for each element;

storing the element value for each element whose property is determined to be stored in plain text; and storing an encrypted element value for each element whose property is determined to be stored encrypted.

13. The method of claim 12 wherein recording at least one action associated with accessing a next Web page via a form submission of a form on its previous Web page further comprises storing for each element an element name and a DOM location of the element relative to the DOM location of the form.

14. The method of claim 1 wherein recording at least one action comprises executing code embedded in a Web page.

15. The method of claim 1 wherein the file is stored on a client with the player program.

16. The method of claim 1 wherein the file is stored on a client and the player program is stored at a Web site on the computer network.

17. The method of claim 1 wherein the file and the player program are stored at a Web site on the computer network.

18. The method of claim 1 further comprising modifying each Web page loaded into the browser to include event handlers in association with elements within the page to catch link traversals and form submissions.

19. A method of accessing a Web page over a computer network comprising:

in response to a request by a user, reading data from a previously created file that indicates information for successively loading into a browser a sequence of an essentially unconstrained plurality of successive Web pages from a first Web page to a last Web page and in which each next Web page in the sequence is reached from its previous Web page by a stored action in the file that effects a transition from that previous Web page to its next Web page, and in which other than the action that effects the transition from each previous Web page to its next successive Web page, the relationship between each next Web page and its previous Web page being essentially unconstrained; and substantially immediately after the request, sequentially retrieving the plurality of Web pages automatically.

20. The method of claim 19 further comprising displaying the last Web page in a browser.

21. The method of claim 20 further comprising displaying at least one other of the sequence of the plurality of Web pages in the browser.

22. The method of claim 20 wherein a next Web page is automatically retrieved after its previous Web page is retrieved.

23. The method of claim 20 wherein a next Web page is retrieved in response to an input from the user after its previous Web page is retrieved.

24. The method of claim 20 wherein the stored action that effects a transition from a previous Web page to its next Web page is a link traversal on that previous page.

25. The method of claim 24 further comprising determining a link on a previous Web page that best matches the information in the file for the link traversal to its next Web page, and retrieving as its next Web page the page corresponding to the link on the previous page with the best match.

26. The method of claim 25 further comprising aborting retrieval of the next page if not best match is determined on the previous page.

27. The method of claim 20 wherein the stored action that effects a transition from a previous Web page to its next Web page is the submission of a form on the previous page.

28. The method of claim 27 wherein the method further comprises determining a form on the previous page that best matches the information in the file for the form submission to the next page.

29. The method of claim 28 wherein the information in the file for the form submission comprises a DOM location of the form a URL to which to submit the form, a number of elements in the form, and a property and a value associated with the elements.

30. The method of claim 28 wherein if the property of an element indicates that its value is to be inputted by a user, the method further comprises accepting an input from the user of that element value, and submitting the form to the URL indicated in the file for the form submission with the user-inputted element value for that element and values for the other elements determined from the information in the file for that file submission.

31. The method of claim 20 wherein reading the data from the file is performed by a player program and the file and the player program are stored on a client.

32. The method of claim 20 wherein reading the data from the file is performed by a player program that is stored at a Web site on the computer network and the file is stored on a client, the method further comprising downloading the player program to the client.

33. The method of claim 20 wherein reading the data from the file is performed by a player program that is stored on a Web site on the computer network and the file is stored at the Web site, the method further comprising downloading the last of the sequence of the plurality of Web pages to a browser in the client.

34. The method of claim 20 wherein multiple actions are executed to access a next page from a previous page, one such action comprising executing code embedded in the previous page.

* * * * *